(12) United States Patent
Hancer et al.

(10) Patent No.: US 7,746,600 B2
(45) Date of Patent: *Jun. 29, 2010

(54) ENCAPSULANT FOR A DISC DRIVE COMPONENT

(75) Inventors: Mehmet Hancer, Eagan, MN (US); Marsha A. Huha, Minneapolis, MN (US); John S. Wright, Minneapolis, MN (US); Lee Walter, Plymouth, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 1485 days.

This patent is subject to a terminal disclaimer.

(21) Appl. No.: 10/700,031

(22) Filed: Nov. 3, 2003

(65) Prior Publication Data

US 2004/0201926 A1    Oct. 14, 2004

(51) Int. Cl.
*G11B 5/596* (2006.01)

(52) U.S. Cl. .................................. 360/294.4

(58) Field of Classification Search ........................ None
See application file for complete search history.

(56) References Cited

U.S. PATENT DOCUMENTS

| | | |
|---|---|---|
| 4,327,387 A | 4/1982 | Plotto |
| 4,383,129 A | 5/1983 | Gupta et al. |
| 4,863,809 A | 9/1989 | Brar et al. |
| 4,977,655 A | 12/1990 | Martinelli |
| 4,992,300 A | 2/1991 | Ogawa et al. |
| 5,002,058 A | 3/1991 | Martinelli |
| 5,271,802 A | 12/1993 | Chang et al. |
| 5,332,944 A | 7/1994 | Cline |
| 5,336,550 A | 8/1994 | Ganapathi et al. |
| 5,425,988 A | 6/1995 | Ogawa et al. |
| 5,598,193 A | 1/1997 | Halko et al. |
| 5,652,025 A | 7/1997 | Tuminello et al. |
| 5,661,618 A | 8/1997 | Brown et al. |
| 5,686,548 A | 11/1997 | Grainger et al. |
| 5,686,549 A | 11/1997 | Grainger et al. |
| 5,718,949 A | 2/1998 | Schultz et al. |
| 5,781,377 A * | 7/1998 | Koka et al. ................ 360/235.1 |
| 5,811,177 A | 9/1998 | Shi et al. |
| 5,898,541 A | 4/1999 | Boutaghou et al. |
| 6,146,767 A | 11/2000 | Schwartz |
| 6,157,522 A | 12/2000 | Murphy et al. |
| 6,290,331 B1 | 9/2001 | Agarwal et al. |
| 6,335,224 B1 | 1/2002 | Peterson et al. |
| 6,358,021 B1 | 3/2002 | Cabuz |
| 6,359,758 B1 | 3/2002 | Boutaghou |
| 6,479,111 B2 | 11/2002 | Dykes et al. |
| 6,500,604 B1 | 12/2002 | Dimitrakopoulos et al. |

(Continued)

FOREIGN PATENT DOCUMENTS

JP    09120525    5/1997

(Continued)

*Primary Examiner*—David D Davis
(74) *Attorney, Agent, or Firm*—Kinney & Lange, P.A.

(57) ABSTRACT

A slider is used in an actuation system and carries a transducing head for transducing data to and from a rotatable recording disc. The slider includes a slider body having a leading edge and a trailing edge and a transducing head positioned proximate the trailing edge of the slider body. An encapsulant comprised of a self assembled monolayer covers exposed surfaces the slider body.

17 Claims, 5 Drawing Sheets

U.S. PATENT DOCUMENTS

| | | |
|---|---|---|
| 6,531,224 B1 | 3/2003 | Fryxell et al. |
| 6,548,140 B1 | 4/2003 | Gui et al. |
| 6,583,953 B1 | 6/2003 | Han et al. |
| 6,586,069 B2 | 7/2003 | Dykes et al. |
| 6,617,762 B2 * | 9/2003 | Kurano et al. ............... 310/328 |
| 6,624,944 B1 | 9/2003 | Wallace et al. |
| 6,743,481 B2 | 6/2004 | Hoehn et al. |
| 6,822,833 B2 * | 11/2004 | Yang et al. ............. 360/125.64 |
| 6,930,861 B2 * | 8/2005 | Huha et al. ............... 360/294.4 |
| 2002/0075605 A1 | 6/2002 | Nishida et al. |
| 2003/0062804 A1 | 4/2003 | Uchiyama |
| 2004/0156145 A1 | 8/2004 | Koishi |
| 2004/0223256 A1 * | 11/2004 | Feng et al. .................. 360/122 |
| 2004/0223262 A1 | 11/2004 | Feng et al. |

FOREIGN PATENT DOCUMENTS

| | | |
|---|---|---|
| JP | 2001-043650 | 2/2001 |
| JP | 2001-297410 | 10/2001 |

* cited by examiner

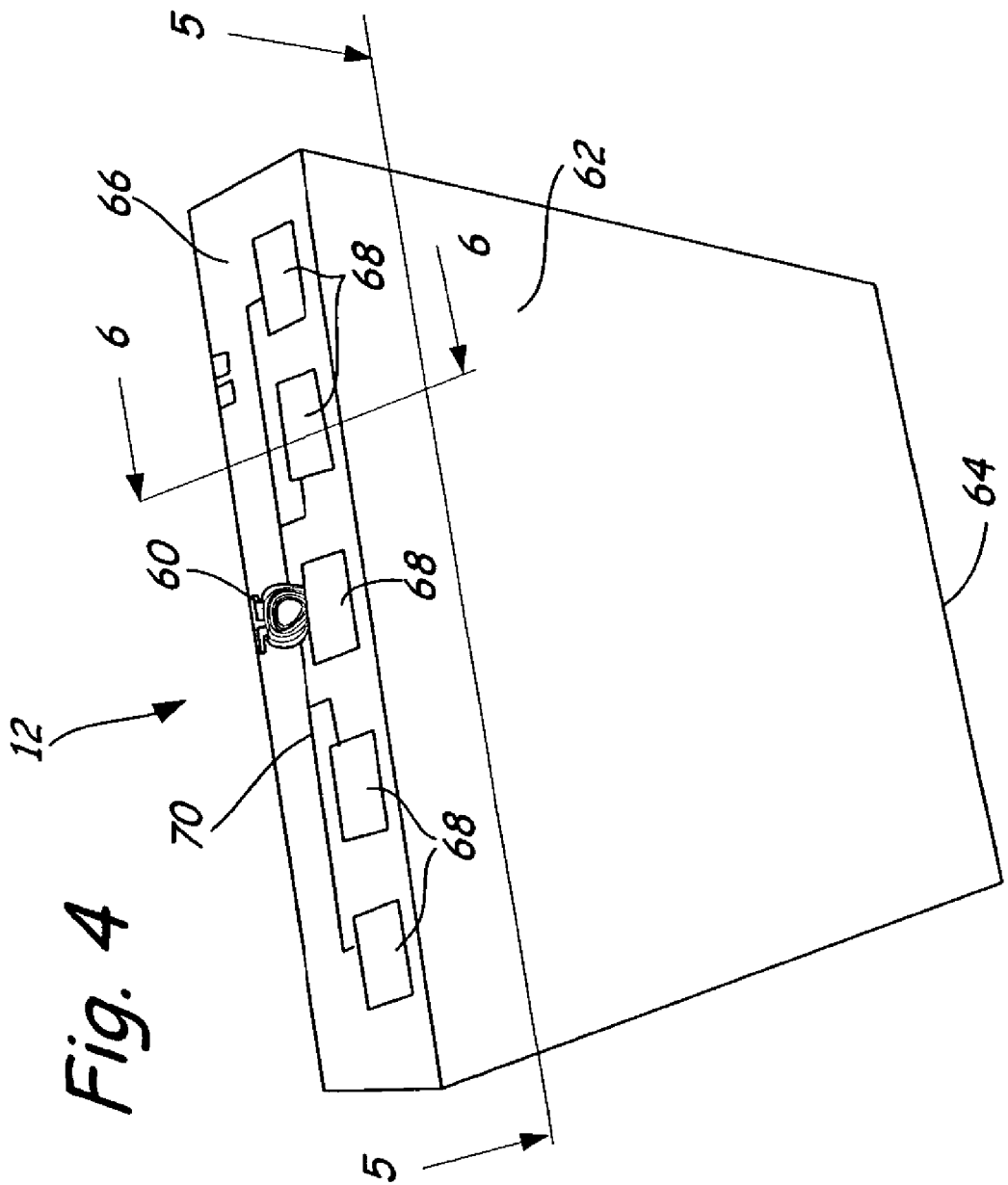

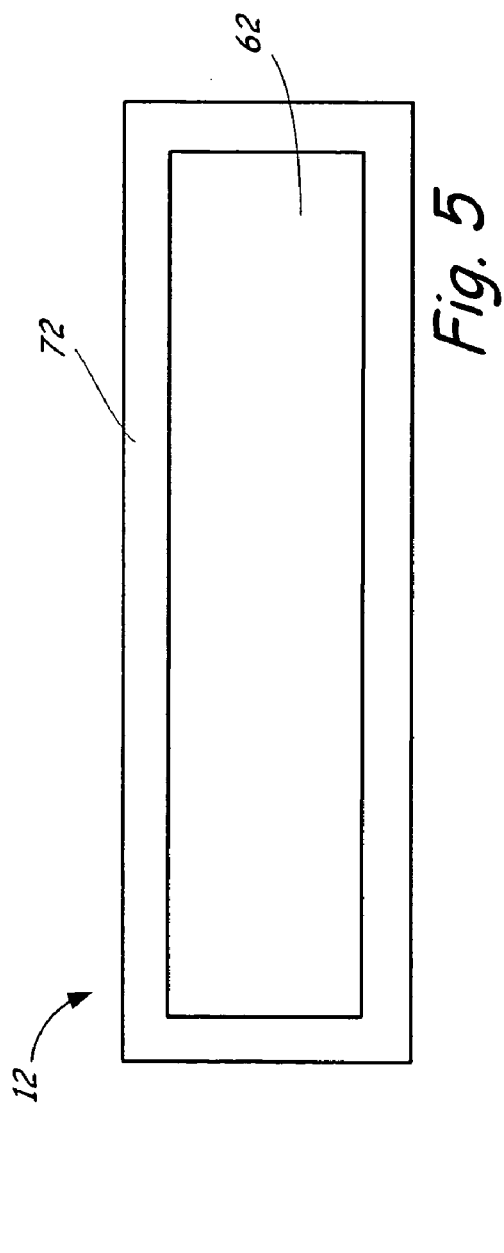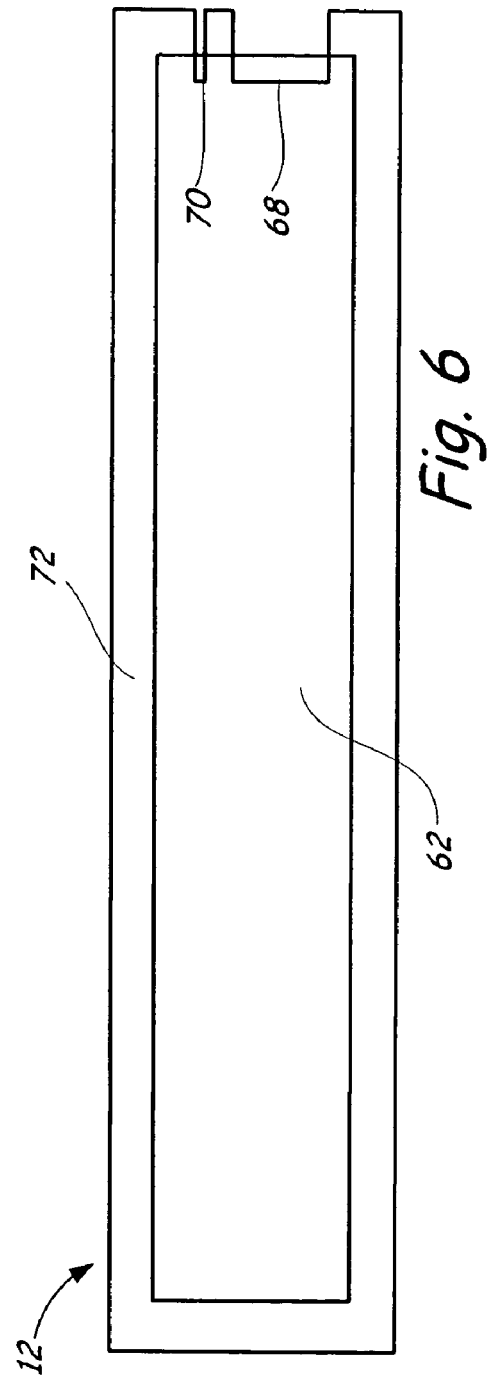

ENCAPSULANT FOR A DISC DRIVE COMPONENT

BACKGROUND OF THE INVENTION

The present invention generally relates to a disc drive microactuator. More particularly, the invention relates to an encapsulant covering all exposed surfaces of a component wherein the component may be selected from the group consisting of the microactuator, slider, disc spacer, surface mount component on a printed circuit card assembly, or a ceramic component of a disc drive. The invention further relates to a microactuator driven by piezoelectric (lead-zirconate-titanate) crystals, the microactuator having improved cleanliness and decreased particle generation levels within the drive.

Disc drive systems include disc drive suspensions for supporting transducing heads over information tracks of a rotatable disc. Typically, suspensions include a load beam having a mounting region on a proximal end, a flexure on a distal end, a relatively rigid region adjacent to the flexure, and a spring region between the mounting region and the rigid region. An air bearing slider, which holds the transducing head, is supported by the flexure. The mounting region is typically attached to a base plate for mounting the load beam to an actuator arm. A motor, which is controlled by a servo control system, rotates the actuator arm to position the transducing head over the desired information tracks on the disc. This type of suspension is used with both magnetic and non-magnetic discs.

The density of concentric data tracks on magnetic discs continues to increase (i.e., the size of data tracks and radial spacing between data tracks are decreasing), requiring more precise radial positioning of the transducing head. Conventionally, head positioning is accomplished by operating an actuator arm with a large-scale actuation motor, such as a voice coil motor (VCM), to radially position the head on the slider at the end of the actuator arm. The large-scale motor lacks sufficient resolution to effectively accommodate high track density discs. Thus, a high resolution head positioning mechanism, or microactuator, is necessary to accommodate the more densely spaced tracks.

One design for high resolution head positioning involves employing a high resolution microactuator in addition to the conventional low resolution actuator motor, thereby effecting head positioning through dual stage actuation. Various microactuator designs have been considered to accomplish high resolution head positioning. These designs, however, all have shortcomings that limit the effectiveness of the microactuator. Many designs increase the complexity of designing and assembling the existing components of the disc drive, while other designs are unable to achieve the force and bandwidth necessary to accommodate rapid track access. Therefore, those prior designs do not present ideal microactuator solutions.

More recent microactuator designs employ electroactive elements to effect movement of the suspension with respect to the actuator arm, i.e., suspension level microactuators, or to effect movement of the flexure with respect to the suspension. In a suspension level microactuator, the electroactive elements generally include piezoelectric crystal dies attached between a head mounting block (or base plate) of the actuator arm and the head suspension. The piezoelectric elements are typically ceramic PZT crystals and are either single layer or multi-layer (ML) crystals.

In the field of hard disc drives, ceramic (hard) particles are a major source of damage to recording heads and the disc media, and the PZT crystals are a source of ceramic particles within the drive. In operation, voltage is applied to the PZT crystals to deform the element and thereby effect movement of the suspension with respect to the actuator arm. The voltage application to the piezoelectric element causes expansion and contraction of the PZT die, which causes ceramic particles to be ejected from the surfaces and edges of the element. The particles are a potential source of damage to the recording head and disc media and result in hard errors, head failures, and loss of data.

Cleaning has been the primary method for hard particle removal, but cleaning weakens the grain boundaries and allows for more particles to be freed from the PZT crystal, thereby exasperating the hard particle problem. Multi-layer PZT crystals also pose an additional problem because moisture in the drive environment will cause electrode migration of the Ag—Pd electroding, which can significantly lower the insulation resistance of the ML PZT crystal. This effect will be observed as a loss in stroke performance of the head gimbal assembly over time.

Some prior systems have tried to minimize particles by cleaning of the suspension assembly in an aqueous or solvent system, but have not succeeded because the particle reduction plateaus. Other systems use glob-top encapsulants to minimize particles, but such encapsulants are not useful in a drive environment due to contamination issues and microactuator stroke reduction. In addition, some moisture barrier techniques involve embedding the ends of the layered electrodes in the PZT, but this technique minimizes the effective area of the ML crystal, reduces total potential stroke for a given die size, and contributes more area for particle generation.

Most sliders are composed of alumina titanium carbide (AlTiC), which has a high energy surface. Incoming, ceramic (hard) particles, moisture and lubricant from the recording media easily adhere or adsorb to the slider surface. In addition, the composite structure of AlTiC tends to release particles from its grains due to shock and contact events causing drives to crash or fail when the slider runs over a particle at high speed.

A microactuator and a slider, for example, are needed which minimize particles ejected from the PZT crystals during voltage application, prevent particle shedding due to contact events (including load and unload), significantly reduce surface particulate levels, prevent incoming particle accumulation, adhesion or agglomeration on surfaces, provide a moisture barrier that does not contribute to hard particle generation or lower the insulation resistance in capacitance, mitigate lube pick up from media for recording heads, and improve flyability of recording heads with reduced stiction/friction.

BRIEF SUMMARY OF THE INVENTION

The present invention is directed to an encapsulant suitable for covering exposed surfaces of a component. The component may be usable in an actuation system and may be selected from the group consisting of a microactuator, a slider, a disc spacer, surface mount components on a printed circuit card assembly, or ceramic components of the disc drive. The encapsulant is comprised of a self assembled monolayer, such as an organosilane, organosilicone or n-octadecene.

BRIEF DESCRIPTION OF THE DRAWINGS

FIG. 4 is a bottom perspective view of a slider of the present invention.

FIG. 5 is a cross sectional view of the slider taken along line 5-5 of FIG. 4.

FIG. 6 is a cross sectional view of the slider taken along line 6-6 of FIG. 4.

DETAILED DESCRIPTION

Figure 1:
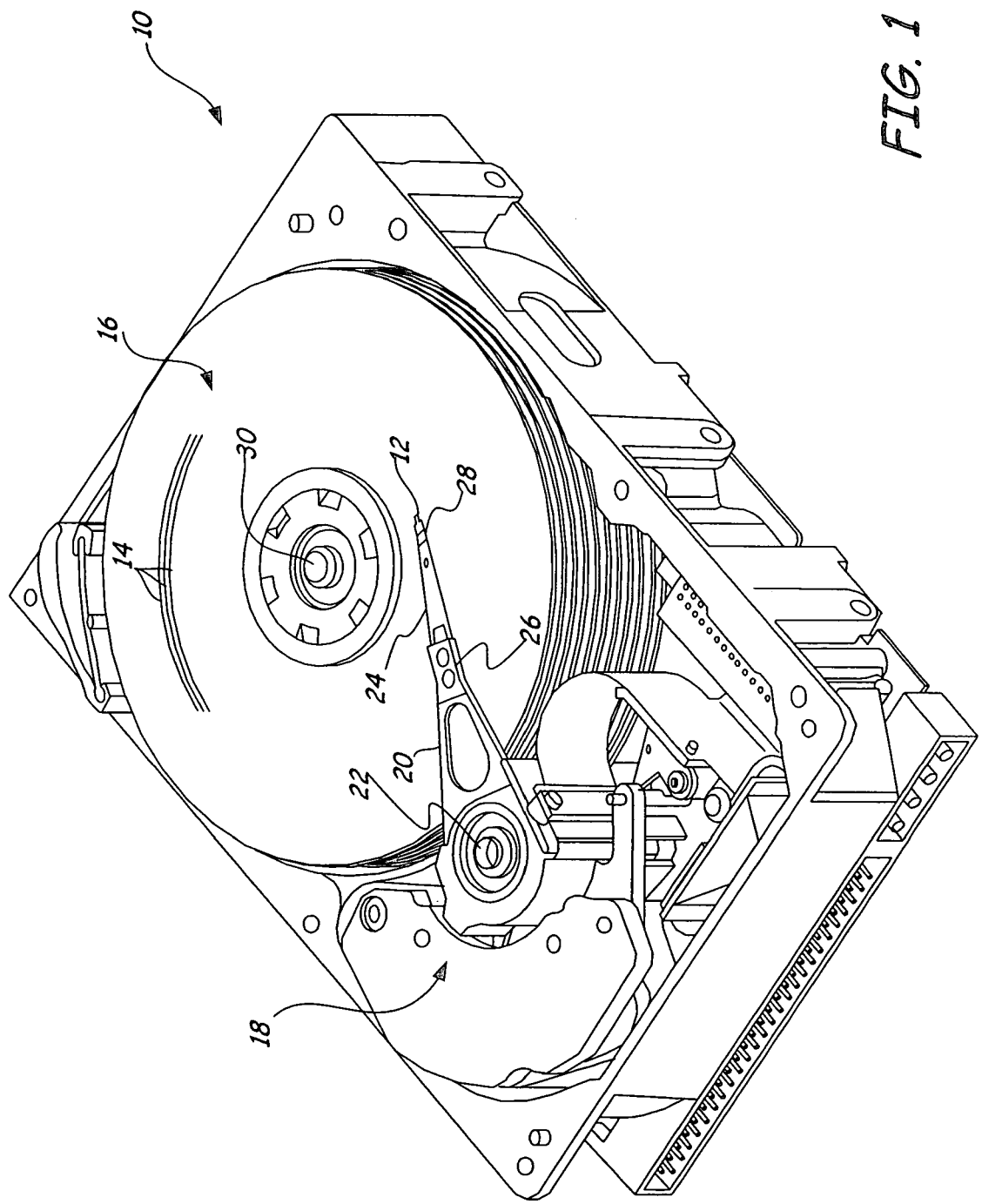
FIG. 1 is a top view of a disc drive actuation system for positioning a slider over tracks of a disc.

FIG. 1 is a top view of a disc drive actuation system 10 for positioning a slider 12 over a track 14 of a disc 16. Actuation system 10 includes voice coil motor (VCM) 18 arranged to actuate an actuator arm 20 on a spindle around an axis 22. A head suspension 24, or load beam, is connected to actuator arm 20 at a head mounting block 26. A flexure 28, or gimbal, is connected to a distal end of head suspension 24, and supports slider 12. Slider 12 carries a transducing head (not shown) for reading and/or writing data on concentric tracks 14 of disc 16. Disc 16 rotates around an axis 30, so that windage is encountered by slider 12 to keep it aloft a small distance above the surface of disc 16.

VCM 18 is selectively operated to move actuator arm 20 around axis 22, thereby moving slider 12 between tracks 14 of disc 16. However, for disc drive systems with high track density, VCM 18 lacks sufficient resolution and frequency response to position the transducing head on slider 12 over a selected track 14 of disc 16. Thus, a higher resolution microactuation device is used to finely position slider 12, as shown in FIG. 2.

Figure 2:
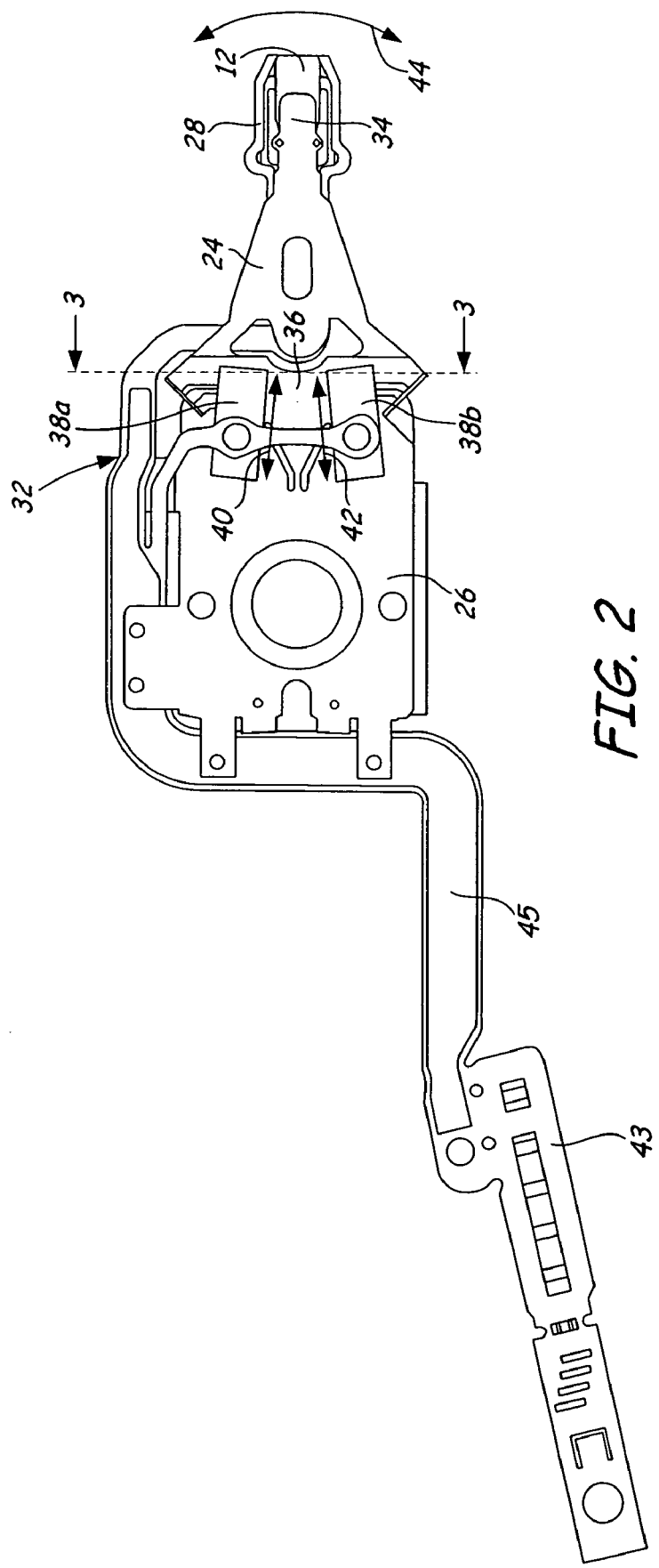
FIG. 2 is a top view of a microactuation system for use in a dual stage disc drive actuation system for high resolution positioning of a slider.

FIG. 2 is a top view of a microactuation system for use in a dual-stage disc drive actuation system for high resolution positioning of slider 12. In particular, FIG. 2 shows a suspension level microactuator 32. Head mounting block 26, or the base plate, is attached to a distal end of actuator arm 20 (not shown). Head suspension 24 is attached to head mounting block 26 by microactuator 32. A distal end 34 of head suspension 24 is attached to flexure 28 and applies a preload force to slider 12 at a load point to force slider 12 into close proximity with a surface of disc 16 when the disc drive is in operation. Slider 12 is attached to flexure 28 by a tongue at a distal end of flexure 28.

The microactuator 32 includes a compliant connection joint 36 for connecting head suspension 24 to head mounting block 26. Head mounting block 26, head suspension 24, and compliant joint 36 may be formed of a single sheet of material. In the embodiment shown in FIG. 2, compliant connection joint 36 is comprised of two beams located between head suspension 24 and head mounting block 26.

Microactuator 32 further includes piezoelectric elements 38a and 38b mounted to head mounting block 26 and head suspension 24, generally parallel to compliant joint 36. Piezoelectric elements 38a and 38b are deformable longitudinally in response to control signals, an applied voltage, across the elements. Expansion and contraction of piezoelectric elements 38a and 38b results in deformation of compliant joint 36, causing rotation of head suspension 24 and slider 12 with respect to head mounting block 26, and thereby effecting high resolution positioning of the transducing head carried by slider 12. Complementary expansion and contraction of piezoelectric elements 38a and 38b in the direction of arrows 40 and 42, respectively, generate force which causes elastic deformation of compliant joint 36, resulting in rotational rigid body movement of head suspension 24 around joint 36 in the direction of arrow 44.

Piezoelectric elements 38a and 38b are generally comprised of PZT (lead-zirconate-titanate) crystal dies having a single layer of poly-crystal material or a multi-layer (ML) comprised of multiple, thin layers of poly-crystal material with electroding between each layer.

Also shown in FIG. 2 is a printed circuit card assembly ("PCCA") 43, which operates as an additional component in the disc drive. Trace 45 electrically connects the slider to PCCA 43. The microactuation system includes several components, including ceramic components, such as slider 12 and disc spacers, and stainless steel components, such as head mounting block 26, head suspension 24, flexure 28, or actuator arm 20.

Figure 3:
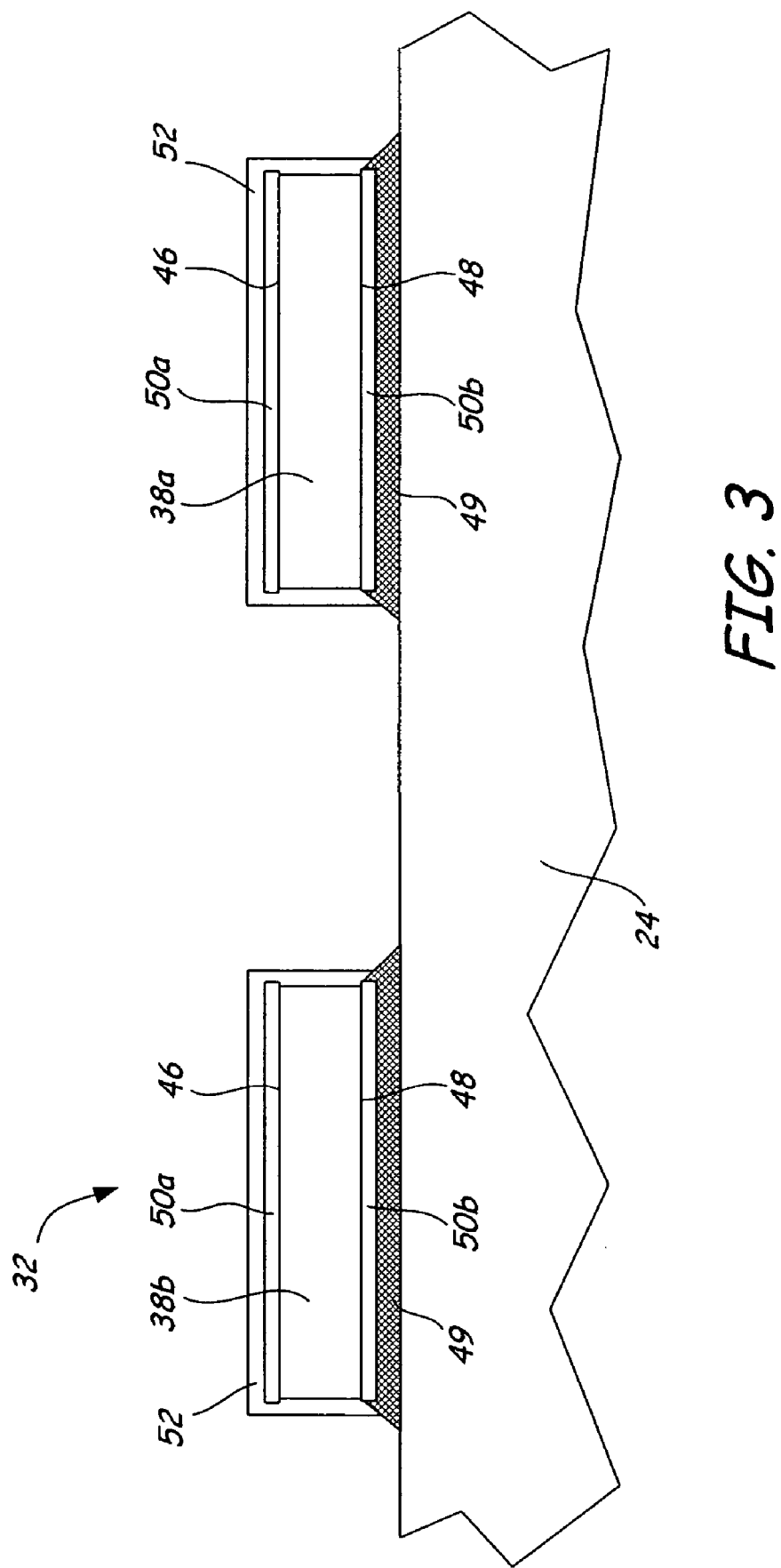
FIG. 3 is a cross sectional view of piezoelectric elements of the microactuator taken along line 3-3 of FIG. 2.

FIG. 3 is cross sectional view of microactuator 32 taken along line 3-3 of FIG. 2. Each piezoelectric element 38a, 38b of the microactuation system has a top surface 46 and a bottom surface 48, with bottom surface 48 being attached to head suspension 24 and head mounting block 26 by a conductive epoxy 49. Both top and bottom surfaces 46, 48 include an electrode 50a and 50b (typically gold), to provide an electrical interconnect between the disc drive and head suspension 24. Top electrodes 50a provide an electrical connection to apply voltage to piezoelectric elements 38a, 38b and actuate head suspension 24.

During operation of microactuator 32, voltage is applied to piezoelectric elements 38a and 38b to cause expansion and contraction of the PZT crystal dies, which results in the ejection of ceramic hard particles from the hard surfaces and edges of the PZT dies. The ejected particles are a major source of damage to recording heads and disc media, and result in hard errors, head failures and loss of data. The present invention is an encapsulant covering all exposed surfaces of piezoelectric elements 38a and 38b within the microactuation system to prevent particle generation during operation of microactuator 32. The encapsulant also serves as a moisture barrier for ML PZT die by preventing water vapor from reaching the electrodes and causing corrosion of the electrodes.

As shown in FIG. 3, an encapsulant 52, or polymer coating, covers all exposed surfaces of piezoelectric elements 38a, 38b (i.e., all surfaces except bottom surface 48) attached to head suspension 24 and head mounting block 26. Polymer coating 52 is preferably applied to piezoelectric elements 38a, 38b prior to placement of piezoelectric elements 38a, 38b within the suspension assembly. Encapsulant 52 may be applied to piezoelectric elements 38a, 38b using various coating techniques, such as, but not limited to, dip or gravity flow coating, spray coating, spin coating, screen coating, roll coating, or vapor deposition. After coating piezoelectric elements 38a, 38b, polymer coating 52 is generally cured to facilitate cross linking of the polymer. Subsequent curing depends on the type of the polymer used, but usually consists of various curing techniques, such as, but not limited to heat, ultraviolet, or electron beam. Cross linking the polymer inhibits encapsulant 52 from becoming mobile during actuation and thereby restricts particles on the surface of elements 38a, 38b from becoming mobile. Once polymer coating 52 is fully cured, measured particles on the surface of elements 38a, 38b are reduced and the encapsulant acts as a moisture barrier to prevent corrosion of electrodes 50a, 50b. The polymer of encapsulant 52 has a minimal elastic constant such that it does not restrict motion of piezoelectric elements 38a, 38b and is electrically non-conductive.

Encapsulant 52 has a thickness of one micron or less so as to not restrict the motion of piezoelectric elements 38a, 38b or inhibit electrical connection to top electrode 50a via soldering. More preferably, the thickness of encapsulant 52 is between 25 and 30 angstroms. The thin coating does not affect performance of piezoelectric elements 38a, 38b, (e.g., stroke performance or electrical performance). Furthermore, coating 52 is thin enough so that an electrical connection may be made to top electrode 50a by soldering without degrading the surrounding encapsulant and/or requiring laser ablation.

In one embodiment, encapsulant 52 is comprised of a polymer coating such as a fluorocarbon polymer, parylene, or an epoxy. More preferably, the polymer is a fluoroacrylate or perfluoropolyether, such as EGC-1700® or Fomblin Z-Tetraol® (manufactured by Ausimont of Italy).

One example of polymer coating 52 is Tetraol®, or other fluoroacrylates or perfluoropolyethers. The fluoropolymers are generally applied to piezoelectric elements 38a, 38b with one of several coating processes, such as dip or gravity flow coating, spray coating or spring coating, to achieve a thin uniform coating. Polymer coating 52 has a thickness between 10 to 100 angstroms, depending upon the concentration of the coating solution and the method of coating used.

Curing cross links the polymer chains to provide a more robust and adhered coating. Curing can take the form of either heat, ultra-violet, or electron beam, depending upon the polymer used. However, the most preferred method of curing for fluoropolymers is electron beam. In the electron beam cure process, electrons are distributed uniformly throughout the coating with energies that can extend to several kilo electron volts (keV), which are much higher energies than the ultraviolet process. An electron beam vacuum cure has energies between 20,000 and 80,000 micro Coulombs per centimeter squared ($\mu C/cm^2$) and an electron beam air or nitrogen cure has energies between 80,000 and 250,000 kilo Grays (kGry).

With fluoropolymers, uniformity of coating is achieved at 20 or more angstroms to allow for reduced liquid particle counts (LPC), minimized particle generation, and reduced degradation in ML PZT crystal stroke from water vapor penetration. In addition, fluoropolymers encapsulants can be soldered through to provide an electrical connection to the piezoelectric element.

A further example of polymer coating 52 is a parylene polymer applied using vapor deposition. The parylene is coated at a thickness between 0.5 microns and 1 micron, such that significant reduction in liquid particle counts are observed and no reduction in insulation resistance is monitored from lifetime testing of ML PZT crystals. Electrical bonding to the piezoelectric element is achieved by maintaining a thin parylene coating or by selectively removing the parylene by abrasion or laser ablation. Parylene coatings reduce the amount of particles extracted from the PZT crystal during liquid particle count. Parylene is also an effective moisture barrier and prevents water vapor from reaching the electrodes, which would cause dendritic growth of the electrodes and corrosion under applied voltage.

Another example of polymer coating 52 used in the present invention is epoxy polymers. Epoxy is applied with one of several coating processes, such as, dip or gravity flow coating, spray coating, spin coating, or roll coating, to achieve a thin uniform coating. The epoxy coating is cured thermally at various temperatures.

In further embodiments of the present invention, encapsulant 52 is composed of a self assembled monolayer (SAM), which covers exposed surfaces of piezoelectric elements 38a, 38b. One example is a SAM of thin organic film selected from the family of organosilicone, or organosilanes, including octadecyltrichlorosilane (OTS), octadecyldimethylchlorosilane, butyltrichlorosilane, perfluorodecyltrichlorosilane, alkylsiloxane, alkyl and perfluoroalkyl-trichlorosilane, dichlorosilane, alkene and alkyl ethoxy silanes, octadecyltriethoxysilane, alkylaminosilanes, and alkanethiols. In further embodiments of the encapsulant, n-octadecene is used as a SAM. SAMs are self-limiting to one layer and adhere to piezoelectric elements 38a and 38b, or other selected components, to form a one layer film covering the component. Encapsulant 52 has a self limiting thickness of one layer of a molecule, which is between about 10 angstroms and about 40 angstroms, and most preferably between about 28 angstroms and about 30 angstroms.

Self assembled monolayers are self-cross linking and do not require an additional step of curing to adhere encapsulant 52 to the component. SAMs are two-dimensional structures that link to itself and other structures. For example, organosilanes will only adhere to ceramic materials, especially ceramic oxides, such as those forming slider 12, piezoelectric elements 38a and 38b, disc spacers, surface mount components on a printed circuit car assembly and other components of the actuation system. In some embodiments of the present invention heat annealing at temperatures between about 100° C. and about 200° C. may be used.

Encapsulant 52 is applied to any area of a component that requires protection from moisture, hard particle generation, or particle accumulation. Two exemplary methods of applying a SAM encapsulant 52 to the component are dip coating and chemical vapor phase deposition (CVD), although other coating techniques known in the art may be used. SAMs of thin organic film, in particular organosilanes, selectively adhere to certain materials (e.g., ceramics) where applied to a component while leaving other materials exposed (e.g., metals or carbon). Thus, during the coating process the SAMs will only adhere to some portions of the component and will not adhere to other portions. In both a dip coating and a CVD coating process, the SAM is dissolved in a solvent, such as n-hexane, n-cylohexane, aromatic hydrocarbons (such as toluene), halogen compounds (such as chloroform), and branched hydrocarbon solvents. Silanization of a substrate (e.g., a slider, microactuator or other ceramic component) results in hydrolysis of a polar head group which turns Si—Cl bonds to Si—OH groups, which then attach to a ceramic oxide surface reacting with the Si—OH (or silanol). The surface of the substrate has a low energy hydrocarbon tail, with water contact angles greater than 110°.

The present invention includes a polymer coating encapsulant covering all exposed surfaces of a piezoelectric element of a microactuation system. The polymer coating provides a moisture barrier to prevent water vapor from reaching the electrodes of the piezoelectric element, which would cause dendritic growth of the electrodes, corrosion under applied voltage, and lower insulation resistance capacitance. In addition, the encapsulant as a moisture barrier does not contribute to hard particle generation. The present invention encapsulant allows for free movement of the PZT crystal, in addition to locking particles at the piezoelectric surface. Furthermore, the polymer coating reduces the amount of particles extracted during liquid particle counts and during voltage application to the piezoelectric element (i.e., the liquid particle counts and aerosol particle counts are lowered and the particle generation from the piezoelectric elements is minimized). The present invention is a cost effective way of reducing contamination in the disc drive for microactuator components because the application and curing of the encapsulant can be performed inline during manufacture of the piezoelectric elements. Furthermore, the present invention is a unique way to prolong the product life of ML PZT in the disc drive environment because of the moisture barrier capabilities.

The present invention encapsulant is also effective as a coating for other components of the actuation assembly to prevent hard particle generation within the assembly, incoming particle accumulation on surfaces, mitigate lube pick up from media and improve flyability of transducing heads. The encapsulant covers exposed surfaces of components of the disc drive, such as the microactuator, the slider, a disc spacer, surface mount components on a printed circuit card assembly, any ceramic component of the disc drive assembly or any stainless steel component of the disc drive assembly, such as the head mounting block, load arm assembly, flexure or actuator arm.

FIG. 4 is a bottom perspective view of slider 12 carrying transducing head 60. Slider 12 includes a slider body 62 having a leading edge 64 and a trailing edge 66 with transducing head 60 positioned at trailing edge 66. Positioned along trailing edge 64 are slider bond pads 68 and interconnects 70 formed between transducing head 60 and slider bond pads 68. Slider bond pads 68 and interconnects 70 are composed of a metallic material, although other conductive materials may be used.

FIGS. 5 and 6 are cross sectional views of slider 12 taken along line 5-5 and line 6-6, respectively, of FIG. 4 illustrating selective adhesion properties of encapsulant 72. Slider 12 is coated with encapsulant 72, which in the embodiment shown in FIGS. 5 and 6 is a SAM that selectively adheres to specific exposed surfaces of slider body 62. Slider body 62 is composed of alumina titanium carbide (AlTiC), silicon or other ceramic material whereas transducing head 60, slider bond pads 68 and interconnects 70 are composed of a substantially metallic material.

Encapsulant 72 is applied to slider 12 by dip coating, vapor phase deposition, or other know coating techniques. SAMs selectively adhere to certain materials forming slider 12 to coat the slider with a thin one layer film. For example, organosilanes, a preferred SAM of the present invention, only adhere to ceramic materials, such as those that comprise slider body 62, microactuator 32, disc spacers surface mount components and other ceramic components of the actuation system. Thus, as shown in FIG. 6, encapsulant 72 coats the exposed ceramic portions of slider 12, such as slider body 62, and does not coat the non-ceramic portions, including diamond like carbon materials, such as transducing head 60, slider bond pads 68 and interconnects 70, which remain exposed. Slider 12 is not be completely covered by encapsulant 72 to maintain a conductive path and mitigate head/media separation problems.

The present invention encapsulant composed of a SAM provides a thin single layer film to protect components of an actuation system, including the slider, microactuator, disc spacer, surface mount components and ceramic components of the system. An encapsulated slider prevents particle shedding due to contact events (including load and unload), prevents incoming particle accumulation, adhesion or agglomeration on surfaces, provides a moisture barrier, mitigates lube pick up from media for recording heads, and improves flyability of recording heads with reduced stiction/friction. By coating or encapsulating AlTiC portions of a slider, the surface energy is lowered and mitigates external disturbances, such as external particles, contaminants, and moisture. In addition, the encapsulating film prevents shedding or release of internal particles during operation (e.g., contact events), creates softer edges, corners and surfaces, and fills in cracks and gaps in the slider substrate. The low surface energy provided by the encapsulant provides a lubrication layer such that the slider has improved flyability over media and improved stiction and friction.

Although the present invention has been described with reference to preferred embodiments, workers skilled in the art will recognize that changes may be made in form and detail without departing from the spirit and scope of the invention.

The invention claimed is:

1. An improved actuation system for positioning a slider carrying a transducing head, the actuation system of the type having a movable actuator arm, a head suspension, a microactuator, a flexure, a slider and a transducing head carried by the slider, the improvement comprising:

an encapsulant comprised of a self assembled monolayer with a self limiting thickness of one layer of a molecule covers an exposed surface of a component selected from the group consisting of the microactuator, the slider, a disc spacer, surface mount components on a printed circuit card assembly, and ceramic components of the actuation system;

wherein the self assembled monolayer is composed of an organosilane selected from the group consisting of octadecyltrichlorosilane (OTS), octadecyldimethylchlorosilane, butyltrichlorosilane, perfluorodecyltrichlorosilane, alkylsiloxane, alkyl and perfluoroalkyl-trichlorosilane, dichlorosilane, alkene and alkyl ethoxy silanes, octadecyltriethoxysilane, alkylaminosilanes, and alkanethiols.

2. The improvement of claim 1 wherein the encapsulant has a thickness in the range of about 10 angstroms to about 40 angstroms.

3. The improvement of claim 1 wherein the encapsulant selectively adheres to exposed ceramic surfaces of the component.

4. The improvement of claim 1, wherein the microactuator comprises:

a first piezoelectric element attached between a mounting block and the head suspension, the first piezoelectric element being deformable in response to a voltage applied thereto;

a compliant joint between the mounting block and the suspension, the compliant joint being flexible to permit movement of the suspension with respect to the mounting block; and wherein the encapsulant comprises a self assembled monolayer covering a surface of the first piezoelectric element.

5. The improvement of claim 4 wherein the self assembled monolayer is composed of an organosilane.

6. The improvement of claim 5 wherein the organosilane is selected from the group consisting of octadecyltrichlorosilane (OTS), octadecyldimethylchlorosilane, butyltrichlorosilane, perfluorodecyltrichlorosilane, alkylsiloxane, alkyl and perfluoroalkyl-trichlorosilane, dichlorosilane, alkene and alkyl ethoxy silanes, octadecyltriethoxysilane, alkylaminosilanes, and alkanethiols.

7. The improvement of claim 4 wherein the self assembled monolayer is composed of N-octadecene.

8. The improvement of claim 4 wherein the encapsulant has a thickness between about 10 angstroms and about 40 angstroms.

9. The improvement of claim 4 wherein the encapsulant selectively adheres to exposed ceramic materials of the first piezoelectric element.

10. The improvement of claim 4, and further comprising a second piezoelectric element attached between the mounting block and the suspension, the second piezoelectric element being covered by an encapsulant comprised of a self assembled monolayer and deformable in a direction complementary to deformation of the first piezoelectric element in response to a voltage applied thereto.

11. An improved actuation system for positioning a slider carrying a transducing head, the actuation system of the type having a movable actuator arm, a head suspension, a microactuator, a flexure, a slider and a transducing head carried by the slider, the improvement comprising:
an encapsulant comprised of a self assembled monolayer with a self limiting thickness of one layer of a molecule covers a surface of a component selected from the group consisting of the microactuator, the slider, a disc spacer, surface mount components on a printed circuit card assembly, and ceramic components of the actuation system;
wherein the self assembled monolayer is composed of N-octadecene.

12. A slider comprising:
a slider body having a leading edge and a trailing edge;
a transducing head positioned proximate the trailing edge of the slider body; and
an encapsulant comprised of a self assembled monolayer with a self limiting thickness of one layer of a molecule covering an exposed surface of the slider body;
wherein the self assembled monolayer is composed of an organosilane selected from the group consisting of octadecyltrichlorosilane (OTS), octadecyldimethylchlorosilane, butyltrichlorosilane, perfluorodecyltrichlorosilane, alkylsiloxane, alkyl and perfluoroalkyltrichlorosilane, dichlorosilane, alkene and alkyl ethoxy silanes, octadecyltriethoxysilane, alkylaminosilanes, and alkanethiols.

13. The slider of claim 12 wherein the encapsulant has a thickness in the range of about 10 angstroms to about 40 angstroms.

14. The slider of claim 12 wherein the encapsulant is substantially uniform.

15. The slider of claim 12 wherein the encapsulant selectively adheres to ceramic surfaces of the slider body.

16. The slider of claim 12 wherein the encapsulant is applied to the slider by dip coating, gravity coating, spray coating, screen coating, roll coating or vapor phase deposition.

17. A slider comprising:
a slider body having a leading edge and a trailing edge;
a transducing head positioned proximate the trailing edge of the slider body; and
an encapsulant comprised of a self assembled monolayer with a self limiting thickness of one layer of a molecule covering a surface of the slider body;
wherein the self assembled monolayer is composed of N-octadecene.

* * * * *